(12) United States Patent
Abad et al.

(10) Patent No.: US 8,427,338 B2
(45) Date of Patent: Apr. 23, 2013

(54) ARCHITECTURE, SYSTEM AND METHOD FOR MODULAR ENVIRONMENTAL CONDITIONS AND OBJECT SENSING

(76) Inventors: Vahid Zarei Seyd Abad, Agoura Hills, CA (US); Ramin Rostami, Calabases, CA (US); Masoud Zarei, Tarzana, CA (US)

(*) Notice: Subject to any disclaimer, the term of this patent is extended or adjusted under 35 U.S.C. 154(b) by 699 days.

(21) Appl. No.: 12/425,375

(22) Filed: Apr. 16, 2009

(65) Prior Publication Data

US 2010/0265098 A1    Oct. 21, 2010

(51) Int. Cl.
*H04Q 9/00* (2006.01)
*G08B 19/00* (2006.01)

(52) U.S. Cl.
USPC ............ 340/870.07; 340/870.09; 340/870.11

(58) Field of Classification Search ............. 340/870.07, 340/870.09, 870.11
See application file for complete search history.

(56) References Cited

U.S. PATENT DOCUMENTS

| | | | |
|---|---|---|---|
| 4,967,184 A * | 10/1990 | Regelsberger | 340/572.8 |
| 6,874,691 B1 | 4/2005 | Hildebrand | |
| 7,009,510 B1 * | 3/2006 | Douglass et al. | 340/531 |
| 7,286,944 B2 | 10/2007 | Fox | |
| 7,952,485 B2 * | 5/2011 | Schechter et al. | 340/584 |
| 7,986,229 B2 * | 7/2011 | Yeo et al. | 340/539.22 |

* cited by examiner

*Primary Examiner* — Hal Kaplan
(74) *Attorney, Agent, or Firm* — Merle W. Richman, Esq.

(57) ABSTRACT

Embodiments of modular environmental conditions and object sensing at several locations are described generally herein. Other embodiments may be described and claimed.

22 Claims, 8 Drawing Sheets

ARCHITECTURE, SYSTEM AND METHOD FOR MODULAR ENVIRONMENTAL CONDITIONS AND OBJECT SENSING

TECHNICAL FIELD

Various embodiments described herein relate generally to modular environmental condition and object sensing, including apparatus, systems, and methods used in modular environmental conditions and object sensing.

BACKGROUND INFORMATION

It may be desirable to sense environmental conditions and objects at several locations. The present invention provides embodiments that may be used to sense environmental conditions and objects at several locations.

DETAILED DESCRIPTION

Figure 1:
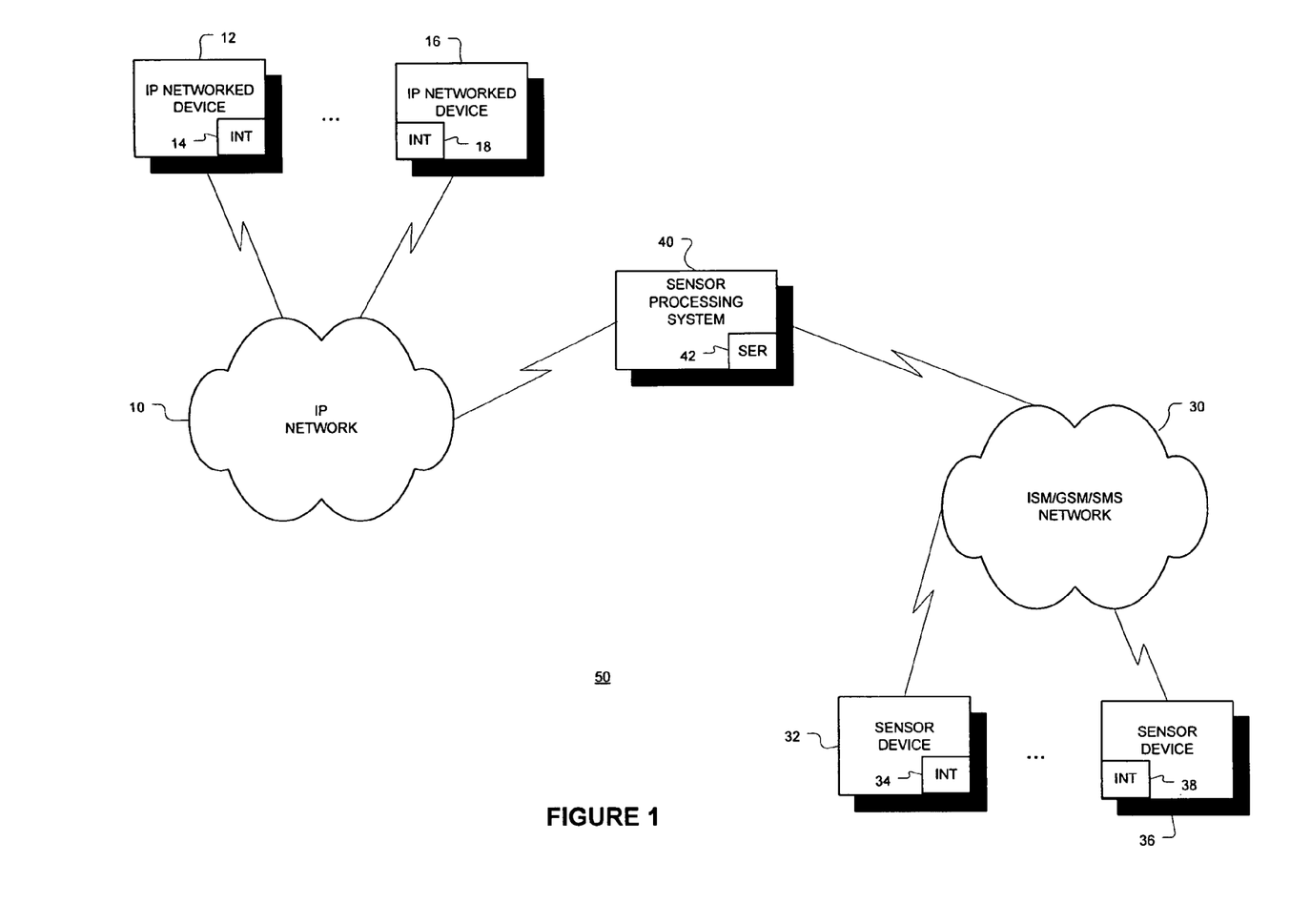
FIG. 1 is a block diagram of wireless networked modular sensor architecture according to various embodiments.

FIG. 1 is a block diagram of sensor processing architecture 10 comprising a sensor processing system (SPS) 40 and several user devices including a plurality of IP networked devices 12, 16, and a plurality of sensor devices 32, 36, according to various embodiments. In an embodiment the sensor processing system (SPS) 40 may be a multi-sensor processing system that may process multiple sensor (multi-sensor) types including environmental condition and object sensing but will be referred to as a sensor processing system (SPS) 40 hereafter. The multi-sensor types may include environmental condition and object sensors. The SPS 40 may include a server 42 that may enable communication between the SPS 40 and the plurality of IP networked devices 12, 16, a central sensor processing system (44 FIG. 3), the plurality of sensor devices 32, 36, and relay devices (22A-C FIG. 2). The SPS 40 may also communicate with the plurality of sensor devices 32, 36, and relay devices (22A-C FIG. 2) via an application specific integrated circuit (ASIC) (274 FIG. 9).

In an embodiment the IP networked devices 12, 16 may be coupled to the SPS 40 via an IP network 10. The IP network 10 may be a local network, a network of networks, or a worldwide network of networks, termed the "Internet". Each IP networked device 12, 16 may include an interface 14, 18 that enables communication between the IP networked device 12, 16 and the SPS 40 server 42 via the IP network 10. The sensor devices 32, 36 may be coupled to the SPS 40 via a network 30. The network 30 may be a terrestrially based network or satellite based network, or combination thereof. Each sensor device 32, 36 may include an interface 34, 38 that enables communication between the sensor device 32, 36 and the SPS 40 server 42 via the network 30. In an embodiment the network 30 may be an industrial, scientific and medical (ISM) radio bands, Groupe Spécial Mobile (GSM), Code-division multiple access (CDMA), time division multiple access (TDMA), mesh, and short messaging system (SMS) based network. Upon initialization of a sensor device 32, 36, the device 32, 36 may link with the sensor processing system 40 using various protocols including a handshake protocol.

Figure 2:
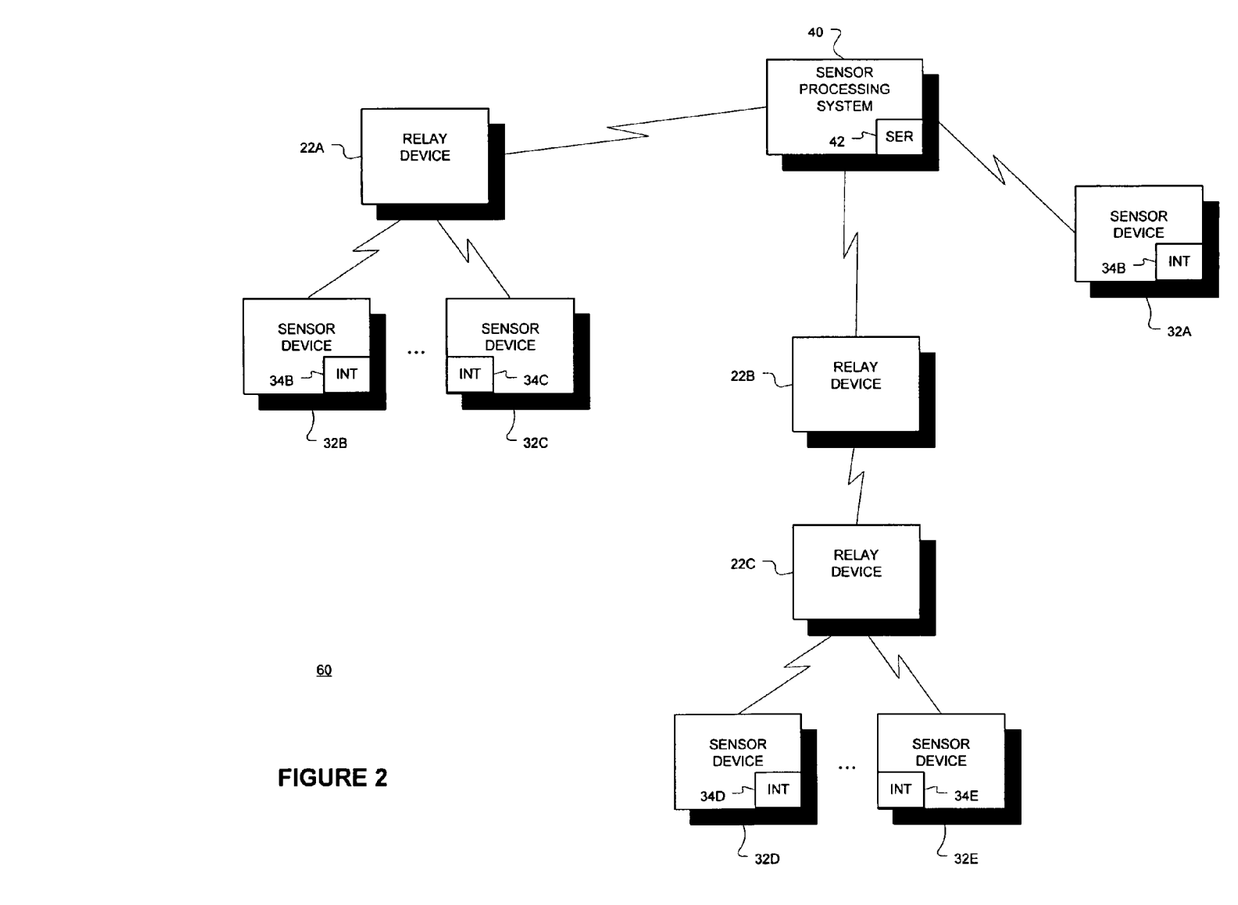
FIG. 2 is a block diagram of wireless modular sensor architecture according to various embodiments.

FIG. 2 is a block diagram of a sensor processing system architecture 60 according to various embodiments. Architecture 60 may include a single sensor processing system (SPS) 40 coupled to a plurality of sensor devices 32(A-E). Each sensor device 32(A-E) may be wirelessly coupled to the SPS 40 via a wireless network 30. Depending on physical characteristics of the SPS 40 location and sensor devices 32(A-E), a sensor device 32(A-E) may have a limited communication range (predetermined distance) in an embodiment. In such physical environment one or more wireless signal relays 22(A-C) may be located between one or more sensor devices 32(A-E). As shown in FIG. 2, several wireless signal relays 22B, 22C may be located between a SPS 40 and a sensor device 32D, 32E as a function of range and physical factors between the SPS 40 and sensor devices 32D, 32E.

In an embodiment, one or more of the SPS 40, relay devices 22(A-C), and sensor devices 32(A-E) may include a wireless transceiver for communicating signals on the wireless network 30. In such an embodiment a SPS 40 may automatically detect relays 22(A-C) and sensor devices 32(A-E) in a SPS network 60. A SPS 40 may send a polling signal that is echoed by relays 22(A-C) and sensor devices 32(A-E) in the network including the linkage between a sensor device 32D and one or more relays 22B, 22C to the SPS 40. The sensor devices 32(A-E) may also communicate with one or more sensing apparatus to sense one or more environmental conditions or objects that are coupled to the sensor device 32(A-E). A user via IP networked device 12, 16 may also configure the relationship between a SPS 40, sensor devices 32(A-E), and relays 22(A-C). In an embodiment a combination of automatic configuration and user selection via an IP networked device 12, 16 may be employed. In an embodiment the relays 22A-C may not be detected by a sensor device 32A-C or sensor processing system 40. A relay 22A-C may repeat signals communicated between a sensor device 32A-C and sensor processing system 40. The communicated signal may include a repeat count value that a relay device 22A-22C evaluates. A relay device 22A-22C may not relay a signal having a repeat count value greater than a predetermined value, n (where n may be 3 or more in an embodiment).

Figure 3:
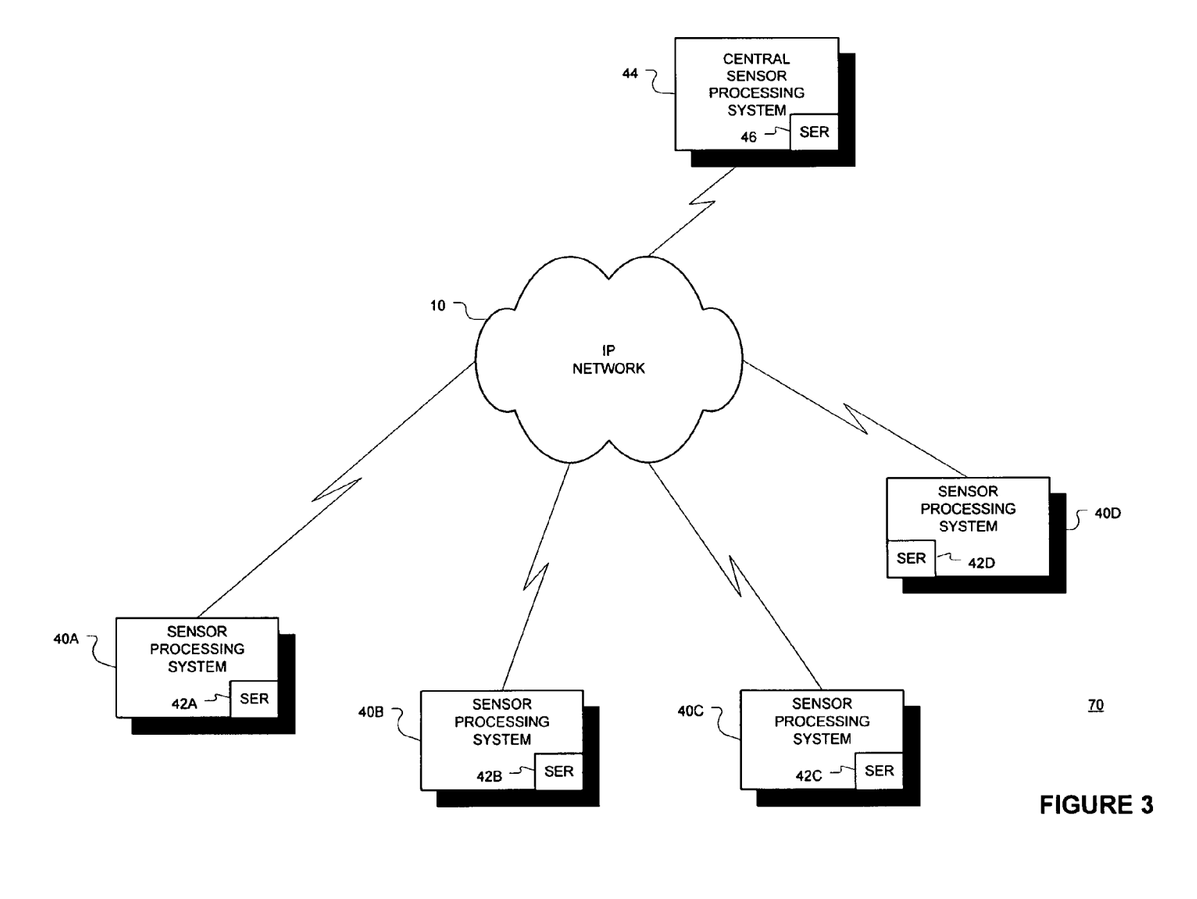
FIG. 3 is a block diagram of wireless sensor architecture with a central sensor system according to various embodiments.

FIG. 3 is a block diagram of a sensor processing system architecture 70 according to various embodiments. Architecture 70 may include a central sensor processing system (SPS) 44 coupled to a plurality of SPS 40(A-D) via an internet protocol (IP) network 10. The central SPS 44 may communicate with each SPS 40(A-D) to configure each SPS 40(A-D) and store information or data collected by each SPS 40(A-D) from sensor devices 32, 36, 32(A-E) coupled to the SPS 40(A-D). The central SPS 44 may backup each SPS 40(A-D) and configure the sensor devices 32, 36, 32(A-E) wirelessly coupled to each SPS 40(A-D). A user via an IP networked device 12, 16 may also control one or more SPS 40(A-D) and sensor devices 32, 36, 32(A-E) via the central SPS 44. It is noted that each SPS 40(A-D) may be wired or wirelessly coupled to the IP network 10. The central SPS 44 may also be wired or wirelessly coupled to the IP network 10.

In an embodiment the interfaces 14, 18, 34, and 38 may each include a hyper-text markup language (HTML) converter such as a browser and the servers 42, 46 may communicate sensor and sensor manipulation controls to a device 12, 16, 32, 36 via one or more web pages. Further, the interfaces 14, 18, 34, and 38 may convert digital signals to Dual-tone multi-frequency (DTMF) signals where combinations of the DTMF signals may control the manipulation of sensor signals that may be generated or forwarded from a device 12, 16, 32, 36. Also the interfaces 14, 18, 34, and 38 may enable messaging services between a device 12, 16, 32, 36 and a server 42. The messaging services may include short messaging service (SMS) based messages that may control the manipulation of sensor signals and enable receipt of sensor information including alarm conditions.

Figure 4A:
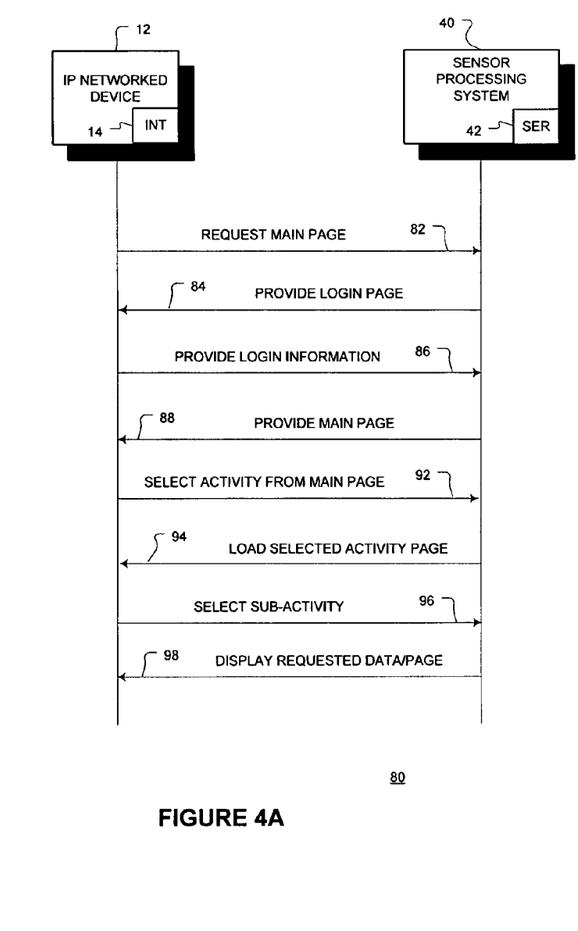
FIG. 4A is a diagram of communication between an IP networked device and a sensor processing system in a wireless networked modular sensor architecture according to various embodiments.

FIG. 4A is a diagram of communications 80 between an SPS 40 and an IP networked device 12 according to various embodiments. In an embodiment, a user via an IP networked device 12, 16 may desire to communicate with a SPS 40, 40(A-D). A user via an IP networked device 12, 16 including an IP enabled device may request a main page or other control or data page 82 from the SPS 40 server 42. In an embodiment the SPS 40 server 42 may receive and process any IP requests 82 directly. In response to a page request 82 from an IP networked device 12, an SPS 40 server 42 may determine whether the user has an active session and provide a main page 88 via the server 42 and IP network 10 when an active session is detected. Otherwise an SPS 40 server 42 may provide a login page 84 to user via the IP network 10 and IP networked device 12, 16. A user via an IP networked device 12, 16 may provide login credentials 86.

Based on the user credentials provided in the login information 86, the SPS 40 server 42 may provide a specific or generic page 88 enabling particular or generic control or data access for the SPS 40, relays 22(A-C), and sensor devices 32, 36, 32(A-E). A user via an IP networked device 12, 16 may select an activity 92 from the provided page 88. The activity may include configuring the SPS 40, server 42, relay 22(A-C), or sensor devices 32, 36, 32(A-E), retrieving data from one or more sensor probes (236 FIG. 8) coupled to one or more sensor devices 32, 36, 32(A-E), requesting a graph or report summarizing or detailing SPS 40, server 42, relay 22(A-C), or sensor devices 32, 36, 32(A-E) configuration, operation conditions (including battery level(s)), communication statistics, one or more sensor probe data (236 FIG. 8) from one or more sensor devices 32, 36, 32(A-E), security settings, user settings, and other settings.

A user via an IP networked device 12, 16 may select one or more activities 92 from the provided page. The SPS 40 server 42 may receive the activity requests 92 and perform the activities as appropriate including forwarding a selected activity page 94 to user's IP networked device 12, 16. The user via the IP networked device 12, 16 may select one or more sub-activities 96 from the provided page 94. The SPS 40 server 42 may receive the sub-activity requests 96 and perform the sub-activities as appropriate including forwarding a selected sub-activity page 98 to user's IP networked device 12, 16.

Figure 4B:
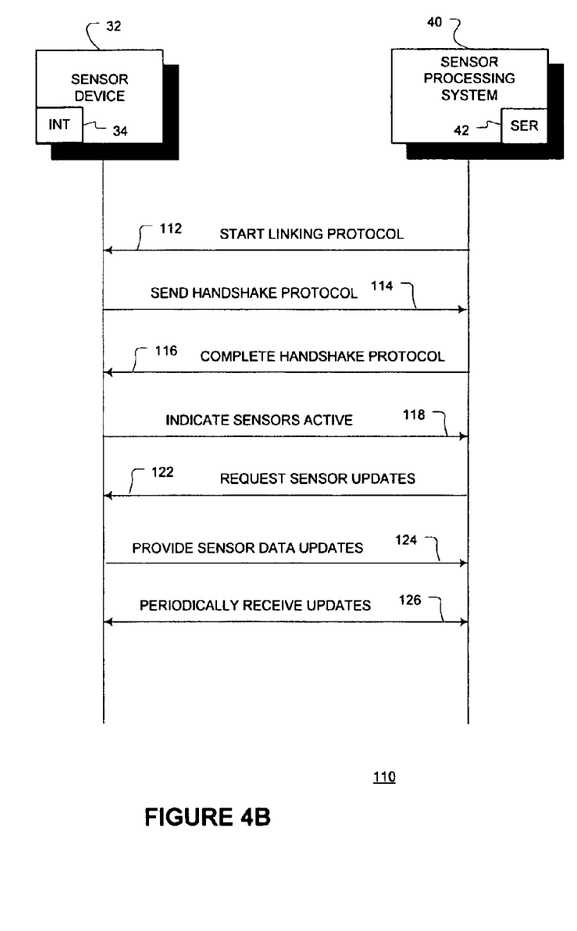
FIG. 4B is a diagram of communication between a sensor processing system and a sensor device in a wireless networked modular sensor architecture according to various embodiments.

FIG. 4B is a diagram of communications 110 between an SPS 40 and a sensor device 32 according to various embodiments. In an embodiment, a SPS 40 relationship to one or more sensor devices 32, 36, 32(A-E) may be established manually or automatically using a handshake protocol. In an embodiment a SPS 40 may forward a start linking protocol message 112 wirelessly via the network 30 using various predetermined protocols. One or more sensor devices 32, 36, 32(A-E) may send a response signal or send handshake protocol 114 to an SPS 40 providing the protocol message 112. The SPS 40 may acknowledge a communication link has been established with a sensor device 32, 36, 32(A-E). The SPS 40 may provide a predetermined channel or bandwidth segment or mask to a sensor device in the start linking protocol message 112 or the complete handshake protocol message 116.

In an embodiment a predetermined channel or bandwidth segment or mask for initial linking may be used for the linking protocol activity 112, 114, 116. A sensor device 32, 36, 32(A-E) may provide an indication of the number, type, and data parameters of one or more sensor probes (236 FIG. 8) electronically coupled to the sensor device 118. The SPS 40 may store the sensor device configuration data including sensor probe 236 information in one or more databases 277, 276, 278 (FIG. 9). A SPS 40 may periodically request 122 or the sensor device 32, 36, 32(A-E) may periodically provide (126) an indication of the number, type, and data parameters of one or more sensor probes (236 FIG. 8) electronically coupled to the sensor device 118 (message 124). The SPS 40 may store the sensor device configuration data including sensor probe 236 information in one or more databases 277, 276, 278 (FIG. 9). The SPS 40 may also evaluate the received sensor probes 236 information (124, 126) to determine alarm conditions, sensor status, and other status. The SPS 40 may store the determined conditions in the one or more databases 277, 276, 278 (FIG. 9).

Figure 5A:
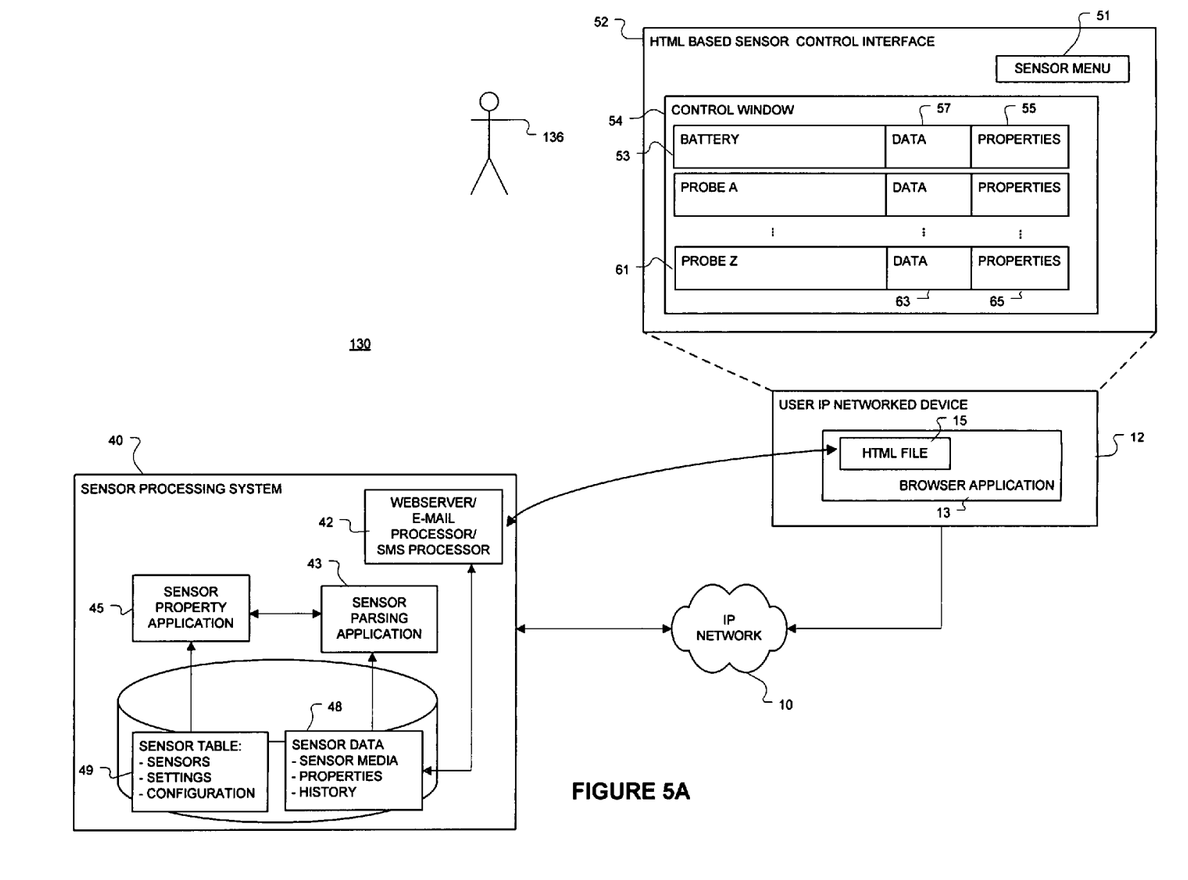
FIG. 5A is a block diagram of sensor processing architecture according to various embodiments.
Figure 5B:
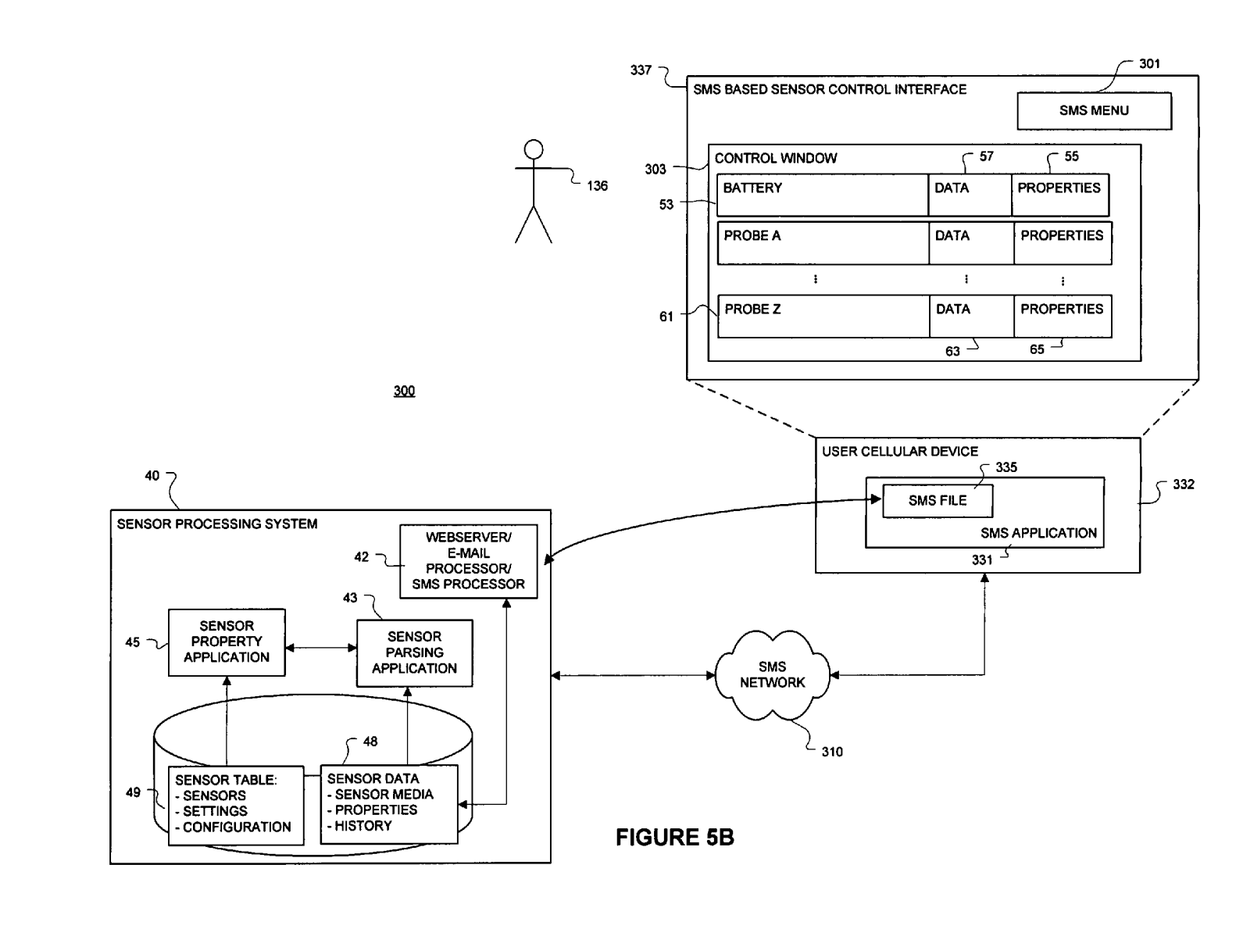
FIG. 5B is a block diagram of sensor processing architecture according to various embodiments.

FIG. 5A is a block diagram of sensor processing architecture 130 comprising a sensor processing system (SPS) 40 coupled to an IP networked device 12, 16 via an IP network 10 according to various embodiments. The SPS 40 may include a hypertext meta language (HTML) generator or webserver, E-mail processor, and SMS processor 42, sensor parsing application 43, sensor property application 45, sensor table 49, and sensor data table or queue 48. The device 12 may include a browser application 13 as part of the interface 14 to receive process, generate, and communicate HTML pages between itself and the SPS 40. The device 332 may include a SMS application 331 to receive process, generate, and communicate SMS messages between itself and the SPS 40 (such as shown in FIG. 5B). The device 12 may provide a user 136 a sensor control or manipulation interface 52. The interface 52 may include a sensor menu 51 and SPS control window 54. The SPS control window 54 may list devices to be controlled including SPS 40 and sensor devices 32, 36, 32(A-E) batteries 53, sensor devices 32, 36, 32(A-E) and sensor probes A to Z 61 coupled to a sensor devices 32, 36, 32(A-E), device data 57, 63 (such as battery level(s), probe level(s)), and device properties (including status, range, location, configuration) 55, 65 for one or more active devices effectively coupled to the SPS 40 where the devices may be actually coupled to a sensor device 32, 36, 32(A-E).

The SPS 40 webserver—E-mail processor—SMS processor 42 may receive sensor device, SPS 40, and sensor probe 236 processing or manipulation requests from the device 12. The requests may be embedded in an HTML page (main, activity, sub-activity page), SMS message(s), or include one or more DTMF signals (where the device 12 may include a dial pad and be selectable via the sensor control interface 52.) The webserver/E-mail processor and SMS processor 42 may extract sensor device, SPS 40, and sensor probe 236 status, report, graph, or configuration requests from received HTML content, SMS message(s) or DTMF signal(s) for storage in the sensor data table 48. The sensor parsing application 43 may retrieve and process requests stored in the sensor data table 48. The sensor parsing application 43 may first determine whether the request is valid and permissible for the requester and inform the requestor if invalid and remove invalid requests. Otherwise the sensor parsing application 43 may process the request in conjunction with the sensor property application 45 as a function of the request.

The sensor property application 45 may change one or more properties of a sensor devices 32, 36, 32(A-E), SPS 40(A-D), and sensor probe 236 stored in the sensor table or queue 49 or sensor data table 48. The sensor table 49 may store information about users, sensor devices 32, 36, 32(A-E), SPS 40(A-D), and sensor probes 236 coupled to a sensor device 32, 36, 32(A-E). The user information may include sensor format preferences, sensor property preferences, sensor control and access privileges. The sensor parsing application 43 and sensor property application 45 may modify the configuration of sensor devices 32, 36, 32(A-E), SPS 40(A-D), and sensor probes 236 coupled to a sensor device 32, 36, 32(A-E) and store the updated configurations in the sensor table 49 and forward representations of current configuration(s) to the device 12.

The sensor parsing application 43 and sensor property application 45 may also receive status updates and data (including data representing environmental conditions and objects at or near the devices) from sensor devices 32, 36, 32(A-E), SPS 40(A-D), and sensor probes 236 coupled to a sensor device 32, 36, 32(A-E) and store the received status and data in the sensor data table or queue 48 and may forward representations of received status/data to the device 12. The environmental conditions at or near sensor devices 32, 36, 32(A-E), SPS 40(A-D), and sensor probes 236 coupled to a sensor device 32, 36, 32(A-E) may include temperature, humidity, pH levels, salinity levels, gas chromatograph information, electrical energy measurements, gas characteristics (pressure, flow, barometric pressure), and any other physically measurable environmental condition.

A probe 236 may digitally determine these conditions and provide a digital signal having variable signals levels indicating the environmental condition to a sensor device 32, 36, 32(A-E). A probe 236 may use analog measurements to determine these conditions and provide an analog signal having variable analog signals levels indicating the environmental condition to a respective sensor device 32, 36, 32(A-E). The sensor device 32, 36, 32(A-E) may include a sensor probe 236 interface 254 (FIG. 8) that may communicate digital or analog data signals with the sensor probe(s) 236. In an embodiment the sensor interface 254 may include an analog to digital (A/D) converter and a digital to analog converter (A/D). A user 136 may perceive sensor devices 32, 36, 32(A-E), SPS 40(A-D), and sensor probes 236 coupled to a sensor device 32, 36, 32(A-E) configuration and data by selecting the device 53, 61 via the control window 54.

FIG. 5B is a block diagram of sensor processing architecture 300 comprising a sensor processing system (SPS) 40 coupled to a user cellular device 332 via a cellular network 310 according to various embodiments. The cellular device 332 may include an SMS application 331 to receive process, generate, and communicate SMS message(s) 335 between itself and the SPS 40. The device 332 may provide a user 136 a SMS based sensor control or manipulation interface 337. The interface 337 may include an SMS menu 301 and control window 303. The SMS control window 303 may list devices to be controlled including the SPS 40 and sensor devices 32, 36, 32(A-E) batteries 53, sensor devices 32, 36, 32(A-E) and sensor probes A to Z 61 coupled to a sensor devices 32, 36, 32(A-E), device data 57, 63 (such as battery level(s), probe level(s)), and device properties (including status, range, location, configuration) 55, 65 for one or more active devices effectively coupled to the SPS 40 where the devices may be actually coupled to a sensor device 32, 36, 32(A-E)).

In an embodiment a SPS 40 sensor property application 45 and sensor parsing application 43 may determine when a sensor devices 32, 36, 32(A-E) batteries 53, a sensor device 32, 36, 32(A-E) or a sensor probes 236, A to Z 61 coupled to a sensor devices 32, 36, 32(A-E) is operating outside of predetermined configured settings (as stored in the sensor table 49) or data collected from a sensor probes 236, A to Z 61 coupled to a sensor devices 32, 36, 32(A-E) is outside a predetermined range or range(s) (as stored in the sensor data table 48 properties). Based on the configuration or properties, the sensor property application 46 and sensor parsing application 44 may determine the level of variance outside predetermined desired level(s) (configured settings for a SPS 40, a sensor devices 32, 36, 32(A-E) batteries 53, a sensor device 32, 36, 32(A-E) or a sensor probes 236, A to Z 61 coupled to a sensor devices 32, 36, 32(A-E) is operating outside of predetermined configured settings (as stored in the sensor table 49) or data collected from a sensor probes 236, A to Z 61 coupled to a sensor devices 32, 36, 32(A-E).

The SPS 40 sensor property application 45 and sensor parsing application 43 may then perform various user notifications based on the determined variance level(s) and the related notification configuration for sensor devices 32, 36, 32(A-E) batteries 53, sensor device 32, 36, 32(A-E) or sensor probes 236, A to Z 61 coupled to a-sensor devices 32, 36, 32(A-E) that is operating outside of range. The SPS 40 or sensor device 32, 36, 32(A-E) may provide a user perceptible signal including an audible (via speakers 282 FIG. 9 or 245 FIG. 8) or visual signals (displays 268 FIG. 9 or 247 FIG. 8) to indicate the respective variance levels. The SPS 40 may also provide variance level indications via the IP networked device 12, 16, SMS based, cellular device 332, or plain old telephone system (POTS) 332 network. In an embodiment the application 45 may dial one or more telephone numbers assigned to users as a function of the variance and error type. The application 45 may employ voice synthesizers to leave voice mail messages related to the error(s) and variance(s). The SPS 40 may also send variance level indication messages to one or more users via the E-mail processor 42 where the users to receive the SMS or E-mail messages may be configured in the sensor table 49 and be determined as a function of the variance level.

Figure 6:
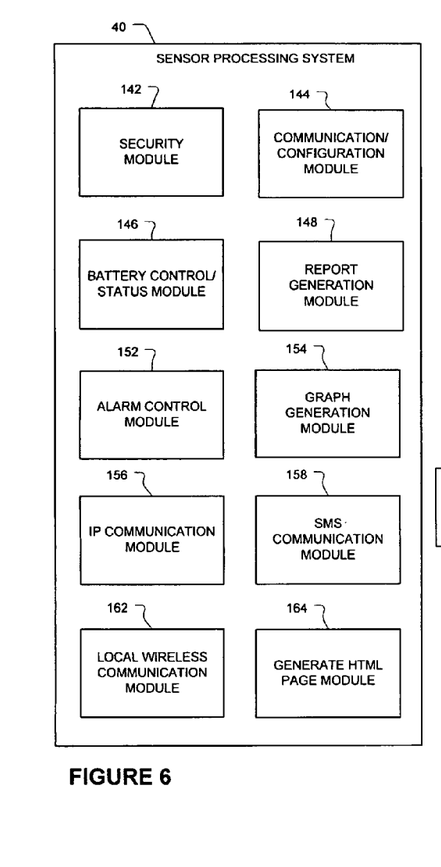
FIG. 6 is a block diagram of a sensor processing system according to various embodiments.

In an embodiment, the SPS 40 may further include a number of modules such as shown in FIG. 6 including a security module 142, a communication configuration module 144, a battery control module 146, a report generation module 148, an alarm control module 152, a graph generation module 154, an IP communication module 156, an SMS communication module 158, an local wireless communication module 162, and a generate HTML page module 164. In an embodiment, the security module 142 may process user login requests from an IP networked device 12, 16 or an SMS device 332 to determine the user's credentials to configure or receive information from the corresponding SPS 40, 40(A-D) and related sensor devices 32, 36, 32(A-E). The security module 142 may control the operations and data that are shown on control interface 337, 52 and the user's ability to modify configurations and clear error or alarm messages or conditions.

The communication control module 144 may control communication between the SPS 40 and IP networked devices 12, 16, SMS devices 332, sensor devices 32, 36, 32(A-E) and relays 22(A-C). The module 144 may automatically link sensor devices 32, 36, 32(A-E) and relays 22(A-C) based on relative proximity to the SPS 40 or user specified preferences or settings for the SPS 40 and the related sensor devices 32, 36, 32(A-E) and relays 22(A-C). The communication control module 144 may work in conjunction with the security module 142 to limit communications as a function of the user's credentials and perform the process 170 shown in FIG. 7A.

Figure 7A:
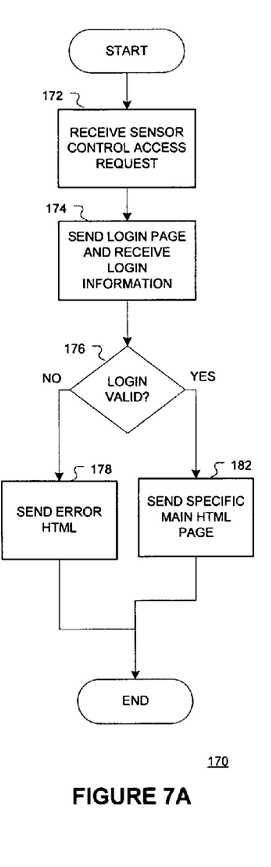
FIG. 7A is a flow diagram illustrating several methods according to various embodiments.

In the process 70, an SPS 40 may receive a sensor control access request (activity 172) from a user 136 via an IP networked device 12, 16 or SMS device 332. The SPS 40 via the generate HTML page module 164 may generate a login page based on the requesting device. The IP communication module 156 or SMS communication module 158 may forward the login page as appropriate for the requesting device (IP device 12, 16 or SMS device 332) (activity 174). It is noted that an IP device 12, 16 may also be able to process SMS messages on the SMS network 310. The SPS 40 via the IP communication device 156 or SMS communication module 158 may receive a user's 136 login information and provide the login information to the security module 142 for credential determination (activity 176). If the user's credentials are invalid or not cleared with the SPS 40, an login error page HTML may be generated by the generate HTML page module and the IP communication device 156 or SMS communication module 158 may forward the login error page as appropriate for the requesting device (IP device 12, 16 or SMS device 332) (activity 178). The security module 142 may track the invalid or inappropriate logins and lock out the IP device 12, 14 or SMS device 332 based on a unique device 12, 14, 332 identifier including a Media Access Control (MAC) address.

Based on the user's credentials as determined by the security module 142, the generate HTML page module may generate a user specific main page (activity 182). The IP communication device 156 or SMS communication module 158 may forward the user specific main page as appropriate for the requesting device (IP device 12, 16 or SMS device 332) (activity 182). The IP communication module 156 may enable the SPS 40 to communicate with an IP device 12, 16 via wired or wireless IP signals. It is noted that one or more sensor devices 32, 36, 32(A-E) or relays 22(A-C) may be IP networked wireless devices in an embodiment and the IP communication module 156 may communicate with such sensor devices 32, 36, 32(A-E) or relays 22(A-C) using a wireless IP signal. The IP communication module may be able communicate wirelessly using various wireless communication standards including Institute of Electrical and Electronics Engineers (IEEE) 802.11 standard (including 802.11a, 802.11b, 802.11g, 802.11n).

The SMS communication module 158 may enable the SPS 40 to communicate with an SMS device 332 via a wired or wireless SMS signal where Short Message Service (SMS) is a communication service standardized in the Groupe Special Mobile (GSM) mobile communication system. It is noted that one or more sensor devices 32, 36, 32(A-E) or relays 22(A-C) may be SMS devices in an embodiment and the SMS communication module 158 may communicate with such sensor devices 32, 36, 32(A-E) or relays 22(A-C) using the SMS communication service standard. The SMS communication module may be able to communicate wirelessly using various wireless SMS communication standards particular to various SMS networks 310.

The local wireless communication module 162 may enable the SPS 40 to communicate with sensor devices 32, 36, 32(A-E) or relays 22(A-C) via wireless signals. It is noted that one or more user devices 12, 16 may be local wireless devices in an embodiment and the local wireless communication module 162 may communicate with such devices 12, 16 using a local wireless signal. The local communication module 162 may be able to communicate wirelessly using various wireless communication standards including the industrial, scientific and medical (ISM) radio bands, Groupe Spécial Mobile (GSM), Code-division multiple access (CDMA), time division multiple access (TDMA), mesh, and other wireless standards, formats, and protocols that may be employed locally. The local wireless communication protocol used by the local wireless communication module 162 may affect the communication range and battery life of the SPS 40, sensor devices 32, 36, 32(A-E), or relays 22(A-C).

Figure 7B:
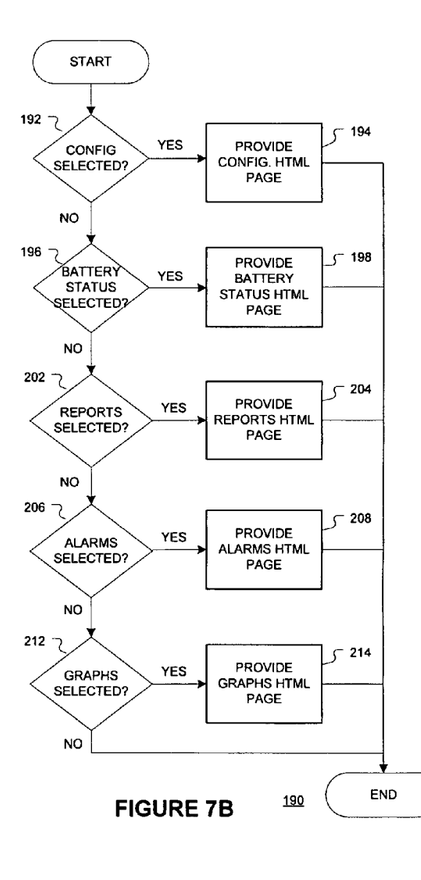
FIG. 7B is a flow diagram illustrating several methods according to various embodiments.

The generate HTML page module 164 may use process 190 in FIG. 7B to generate HTML pages for an IP networked device 12, 16 including a login page and main page. Based on a user's selection the HTML page module 164 may generate a configuration HTML page (activity 194) when a user selects configuration from a main page or other page having the configuration selection (activity 192). The configuration HTML page may enable a user in conjunction with the communication/configuration module 144 to modify one or more configuration settings for the SPS 40, sensor devices 32, 36, 32(A-E) or relays 22(A-C), and the sensor probes 236 coupled the sensor devices. As noted the configuration parameters may include alarm ranges and topology between the SPS 40, sensor devices 32, 36, 32(A-E) or relays 22(A-C).

The HTML page module 164 may generate a battery status HTML page (activity 198) when a user selects battery status from a main page or other page having the battery status selection (activity 196). The battery status HTML page may enable a user in conjunction with the battery control/status module 146 to modify one or more battery usage settings and battery levels for batteries (286 FIG. 9, 256 FIG. 8) of the SPS 40, sensor devices 32, 36, 32(A-E) or relays 22(A-C). The SPS 40, sensor devices 32, 36, 32(A-E) or relays 22(A-C) configuration settings may include battery level alarm and battery usage control including operating intervals of the sensor devices 32, 36, 32(A-E) or relays 22(A-C).

The HTML page module 164 may generate a report generation HTML page (activity 204) when a user selects reports from a main page or other page having the reports selection (activity 202). The reports HTML page may enable a user in conjunction with the report generation module 148 to select one or more reports for data related to alarms, sensors, batteries, configurations and other information related to the SPS 40, the sensor devices 32, 36, 32(A-E), the relays 22(A-C), or the sensor probes 236 coupled to a sensor device. The report page may also enable a user to create their own report and select the output format and delivery method including via IP protocol, HTML page, and E-mail and the formats may include Powerpoint®, PDF®, Word®, Excel®, and other report formats.

The HTML page module 164 may further generate an alarm status/review/confirmation HTML page (activity 208) when a user selects alarms from a main page or other page having the alarms selection (activity 206). The alarms HTML page may enable a user in conjunction with the alarm control module 152 to see alarm status, review stored/detected alarms, and confirm an alarm condition has been addressed for SPS 40, the sensor devices 32, 36, 32(A-E), the relays 22(A-C), or the sensor probes 236 coupled to a sensor device. As noted different alarm conditions may be created as a function of the variance level from the predetermined non-alarm range. After confirmation of an alarm the user confirmation may be stored and reviewable to monitor user's activities. The alarm page may also enable a user to create an alarm specific report and select the output format and delivery method including via IP protocol, HTML page, and E-mail and the formats may include Powerpoint®, PDF®, Word®, Excel®, and other report formats.

Also the generate HTML page module 164 may generate a graphs HTML page (activity 214) when a user selects graphs from a main page or other page having the graphs selection (activity 212). The graphs HTML page may enable a user in conjunction with the graph generation module 154 to select one or more graphs for data related to alarms, sensors, batteries, configurations and other information related to the SPS 40, the sensor devices 32, 36, 32(A-E), the relays 22(A-C), or the sensor probes 236 coupled to a sensor device. The graph page may also enable a user to create their own graph and select the output format and delivery method including via IP protocol, HTML page, and E-mail and the formats may include Powerpoint®, PDF®, Word®, Excel®, and other report formats.

Figure 8:
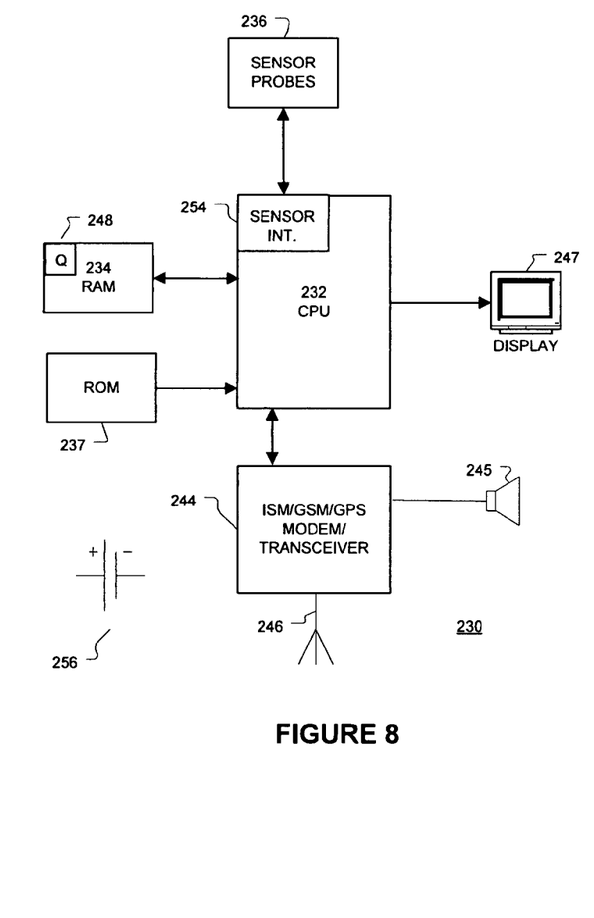
FIG. 8 is a block diagram of an article according to various embodiments.
Figure 9:
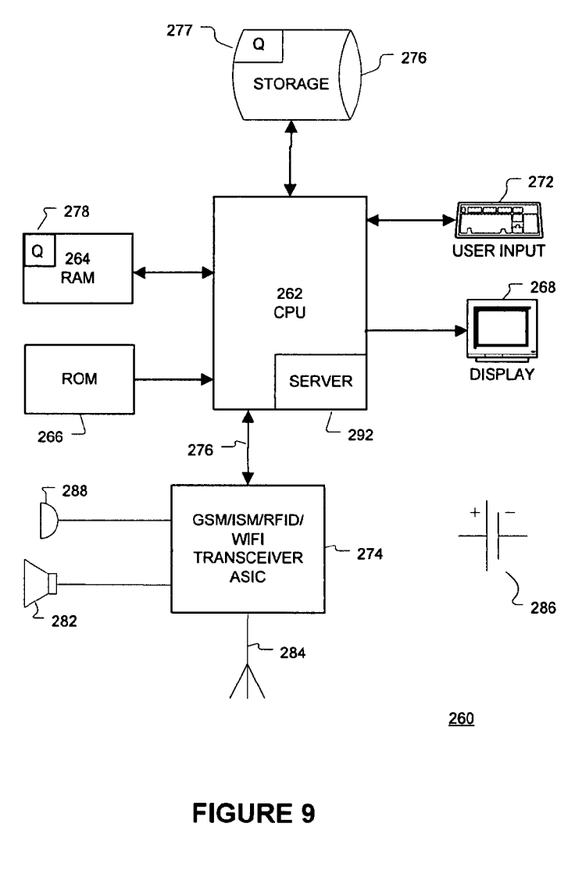
FIG. 9 is a block diagram of an article according to various embodiments.

FIG. 8 illustrates a block diagram of a device 230 that may be employed as a sensor device 32, 36, 32(A-E) in various embodiments. The device 230 may include a central processing unit (CPU) 232, a random access memory (RAM) 234, a read only memory (ROM) 237, a local wireless/GPS modem/transceiver 244, display 247, speaker 245, rechargeable electrical storage element 256, and an antenna 246. The CPU 232 may include a sensor interface 254. The RAM 234 may include a queue or table 248 where the queue 248 may be used to store sensor probe data. The rechargeable electrical storage element may be a battery or capacitor in an embodiment.

The modem/transceiver 244 may couple, in a well-known manner, the device 230 to the wireless network 30, IP network 10, or SMS network 310 to enable communication with a SPS 40. In an embodiment, the modem/transceiver 244 may be a wireless modem or other communication device that may enable communication with the SPS 40. The modem/transceiver 244 may also be able to receive global positioning signals (GPS) and the CPU 232 may be able to convert the GPS signals to location data that may be stored in the RAM 248 and provided to a SPS 40. As noted above the sensor probes 236 may generate digital signals that represent environmental condition data or object data (such radio frequency identification (RDIF) information). The sensor probes 236 may also generate analog signals that represent environmental condition data or object data (such radio frequency identification (RDIF) information).

One or more sensor probes may be interchangeably coupled to the device 230. The sensor probes 236 may indicate their type (data type they represent) and calibration when coupled to the sensor interface 254 using digital or analog indicia representative of the sensor probe 236 type and calibration. The ROM 237 may store program instructions to be executed by the CPU 232 or sensor interface 254. The RAM 234 may be used to store temporary program information, queues, databases, and overhead information. The storage device 234 may comprise any convenient form of data storage and may be used to store temporary program information, queues, databases, and overhead information.

A device 260 is shown in FIG. 9 that may be used in various embodiments as a device 12, 16 or SPS 40. The device 260 may include a central processing unit (CPU) 262, a random access memory (RAM) 264, a read only memory (ROM) 266, a display 268, a user input device 272, a transceiver application specific integrated circuit (ASIC) 274, a microphone 288, a speaker 282, bus 276, electrical energy storage unit 286, and an antenna 284. The CPU 262 may include a server 292. The RAM 264 may include a queue 278 where the queue 278 may store sensor data. The server 292 may function as the web-server/e-mail processor/SMS processor 42 of the SPS 40.

The ROM 266 is coupled to the CPU 262 and may store the program instructions to be executed by the CPU 262 and the server 292. The RAM 264 is coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear received messages, sensor, or pages from the SPS 40 (in the case of the IP networked device 12, 16).

The microphone 288 and speaker 282 may be incorporated into the device 260. The microphone 288 and speaker 282 may also be separated from the device 260. Received data may be transmitted to the CPU 262 via a serial bus 276 where the data may include messages, sensor data, or pages received, messages, sensor data, or pages to be transmitted, or protocol information. The transceiver ASIC 274 may include an instruction set necessary to communicate messages, sensor data or pages in architecture 10, 30, 310. The ASIC 274 may be coupled to the antenna 284 to communicate wireless messages, sensor data, or pages within the architecture 50, 110. When a message is received by the transceiver ASIC 274, its corresponding data may be transferred to the CPU 262 via the serial bus 276. The data can include wireless protocol, overhead information, sensor data, and pages to be processed by the device 260 in accordance with the methods described herein.

The rechargeable electrical storage element 286 may be a battery or capacitor in an embodiment. The RAM 264 may be any digital storage medium and may be coupled to the CPU 262 and may store temporary program data, overhead information, and the queue 278. The queue 278 may store sensor data and web page information.

Any of the components previously described can be implemented in a number of ways, including embodiments in software. Any of the components previously described can be implemented in a number of ways, including embodiments in software. Thus, the CPU 232, sensor interface 252, server 292, modem/transceiver 244, antenna 246, storage 238, RAM 234, ROM 237, queue 248, queue 256, CPU 262, transceiver ASIC 274, antenna 284, microphone 288, speaker 282, 254, ROM 266, RAM 264, queue 278, user input 272, displays 268, 257, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A multi-sensor processing module, including:
a multi-sensor wireless transceiver to wirelessly receive environmental sensor data and battery status data from a plurality of physically and mechanically separated sensor data generation modules, each of the plurality of physically and mechanically separated sensor data generation modules including a battery and the environmental sensor data represents one of temperature and humidity near one of the plurality of sensor data generation modules;
an alarm generation module, the alarm generation module determining when received environmental sensor data is not within a predetermined value range and when received battery status data is not within a predetermined value range;
a web page generation module to generate a web page including wirelessly received environmental sensor data from at least two of the physically and mechanically separated sensor data generation modules and alarm generation module determinations;
a non-volatile data storage module to store received environmental sensor data and alarm determinations; and
an internet protocol (IP) signal transceiver, the transceiver wirelessly transmitting the web page to an IP based device.

2. The multi-sensor processing module of claim 1, wherein the multi-sensor wireless transceiver receives environmental sensor data via a non-IP network.

3. The multi-sensor processing module of claim 1, wherein the multi-sensor wireless transceiver receives environmental sensor data via an IP network.

4. The multi-sensor processing module of claim 1, further including an electronic message generation module, the electronic message generation module sending alarm status information to an electronic address.

5. The multi-sensor processing module of claim 4, wherein the electronic address is an E-mail address.

6. The multi-sensor processing module of claim 4, wherein the electronic address is a short message system (SMS) address.

7. The multi-sensor processing module of claim 1 wherein the web page further includes sensor data generation module battery status information.

8. A multi-sensor processing system, including:
a first sensor data generation module including:
a sensor data generation module, the module coupled to a first sensor and generating a first signal representing an environmental condition near the first sensor;
a first battery; and
a wireless transceiver, the transceiver wirelessly transmitting the first sensor and battery status data;
a second sensor data generation module physically and mechanically separate from the first sensor data generation module, including:
a sensor data generation module, the module coupled to a second sensor and generating a second signal representing an environmental condition near the second sensor;
a second battery and
a wireless transceiver, the transceiver wirelessly transmitting the second sensor and battery status data; and a multi-sensor processing module physically and mechanically separate from the first sensor data generation module and the second sensor data generation module, including:
  a multi-sensor wireless transceiver to wirelessly receive first sensor and battery status data and second sensor and battery status data;
  a web page generation module to generate a web page including wirelessly received first sensor and battery status data and second sensor and battery status data; and
  an internet protocol (IP) signal transceiver, the transceiver wirelessly transmitting the web page to an IP based device.

9. The multi-sensor processing system of claim 8, wherein the multi-sensor wireless transceiver receives first sensor and battery status data and second sensor and battery status data via a non-IP network.

10. The multi-sensor processing system of claim 8, wherein first sensor data and second sensor data represents one of temperature and humidity near the respective sensors.

11. The multi-sensor processing system of claim 10, wherein the multi-sensor wireless transceiver receives first sensor and battery status data and second sensor and battery status data via an IP network.

12. The multi-sensor processing system of claim 11, further including a non-volatile data storage module to store received first sensor and battery status data and second sensor and battery status data.

13. The multi-sensor processing system of claim 12, further including an alarm generation module, the alarm generation module determining when received first sensor data, first battery status data, second battery status data, or second sensor data is not within a predetermined value range.

14. The multi-sensor processing system of claim 13, further including an electronic message generation module, the electronic message generation module sending alarm status information to an electronic address.

15. The multi-sensor processing system of claim 14, wherein the electronic address is an E-mail address.

16. The multi-sensor processing system of claim 10, further including a report generation module, the module generating reports related to received first sensor and battery status data and received second sensor and battery status data.

17. The multi-sensor processing system of claim 16, wherein the web page includes a report generation module report.

18. A multi-sensor processing method, including:
  wirelessly receiving environmental sensor data and battery status data from a plurality of physically and mechanically separated sensor data generation modules, the environmental sensor data representing one of temperature and humidity near the one of the plurality of sensor data generation modules, and each of the plurality of physically and mechanically separated sensor data generation modules including a battery;
  determining when received environmental sensor data is not within a predetermined value range and when received sensor battery status data is not within a predetermined value range;
  generating a web page including wirelessly received environmental sensor data from at least two of the physically and mechanically separated sensor data generation modules and not in range sensor data determinations;
  storing received environmental sensor data and not in range sensor data determinations in a non-volatile data storage module; and
  wirelessly transmitting the web page to an IP based device via an internet protocol.

19. The multi-sensor processing method of claim 18, including wirelessly receiving environmental sensor data via a non-IP network.

20. The multi-sensor processing method of claim 18, further including sending alarm status information to an electronic address.

21. An article including a machine-accessible medium having associated information, wherein the information, when accessed, results in a machine performing the acts of:
  wirelessly receiving sensor environmental data and battery status data from a plurality of physically and mechanically separated sensor data generation modules, the environmental sensor data representing one of temperature and humidity near one of the plurality of sensor data generation modules, each of the plurality of physically and mechanically separated sensor data generation modules includes a battery;
  determining when received environmental sensor data is not within a predetermined value range and when received sensor battery status data is not within a predetermined value range;
  generating a web page including wirelessly received environmental sensor data from at least two of the physically and mechanically separated sensor data generation modules and not in range sensor data determinations;
  storing received environmental sensor data and not in range sensor data determinations in a non-volatile data storage module; and
  wirelessly transmitting the web page to an IP based device via an internet protocol.

22. The article of claim 21, further performing the act of wirelessly receiving environmental sensor data via a non-IP network.

* * * * *